United States Patent
Ito

(10) Patent No.: US 6,408,039 B1
(45) Date of Patent: Jun. 18, 2002

(54) RADIO COMMUNICATION APPARATUS EMPLOYING A RAKE RECEIVER

(75) Inventor: Katsutoshi Ito, Tokyo (JP)

(73) Assignee: Oki Electric Industry Co., Ltd., Tokyo (JP)

( * ) Notice: Subject to any disclaimer, the term of this patent is extended or adjusted under 35 U.S.C. 154(b) by 0 days.

(21) Appl. No.: 09/265,800

(22) Filed: Mar. 10, 1999

(30) Foreign Application Priority Data

Mar. 11, 1998 (JP) .......................................... 10-059636

(51) Int. Cl.[7] ................................................ H04L 1/02
(52) U.S. Cl. ........................ 375/347; 375/130; 370/335
(58) Field of Search ................................ 375/130, 136, 375/347, 349; 370/335, 342, 441, 479; 455/134, 132, 135, 137, 146, 272, 273, 500, 149; 342/444, 463, 465

(56) References Cited

U.S. PATENT DOCUMENTS

| | | | |
|---|---|---|---|
| 5,764,688 A | * 6/1998 | Hulbert et al. | 375/206 |
| 5,920,549 A | * 7/1999 | Bruckert et al. | 370/331 |
| 5,953,382 A | * 9/1999 | Asano et al. | 375/347 |
| 5,987,016 A | * 11/1999 | He | 370/335 |
| 6,072,807 A | * 6/2000 | Daudelin | 370/465 |
| 6,075,811 A | * 6/2000 | Naruse et al. | 375/206 |
| 6,160,799 A | * 12/2000 | Krause et al. | 370/335 |
| 6,269,075 B1 | * 7/2001 | Tran | 370/206 |

FOREIGN PATENT DOCUMENTS

| | | |
|---|---|---|
| EP | 0 690 588 | 1/1996 |
| JP | 8-56384 | 2/1996 |

OTHER PUBLICATIONS

U.S. application No. 60/026,637, Li et al., filed Sep. 24, 1996.
U.S. application No. 08/811,922, Li et al., filed Aug. 5, 1997.
U.S. application No. 08/816,484, Oren et al., filed Aug. 5, 1997.
U.S. application No. 08/828,575, Li et al., filed Aug. 5, 1997.
U.S. application No. 08/828,880, Li et al., filed Mar. 31, 1997.
"Mobile Station–Base Station Compatibility Standard for Dual–Mode Wideband Spread Spectrum Cellular System" Interim Standard IS–95 Section 6.2.2.1. May 1995.

* cited by examiner

*Primary Examiner*—Chi Pham
*Assistant Examiner*—Emmanuel Bayard
(74) *Attorney, Agent, or Firm*—Venable; Robert J. Frank

(57) ABSTRACT

A radio communication apparatus having a rake receiver for searching and combining reception paths. The apparatus includes at least one combination searcher/finger unit which performs a searcher operation for detecting signals on the reception paths and estimates the signal strength of each of the signals. The searcher/finger unit also performs a finger operation which outputs a demodulated symbol in response to a command signal generated by an assignment unit. The assignment unit assigns either a searcher operation or a finger operation to the searcher/finger unit in accordance with the number of reception paths transmitting a signal suitable for demodulation.

17 Claims, 13 Drawing Sheets

RADIO COMMUNICATION APPARATUS EMPLOYING A RAKE RECEIVER

BACKGROUND OF THE INVENTION

1. Field of the Invention

This invention relates generally to a radio communication apparatus comprising part of a radio communication system such as a code division multiple access (CDMA) communication system. More specifically, it relates to a radio communication apparatus employing a rake receiver which combines the useful multipath components of a spread spectrum signal.

2. Description of the Background Art

The CDMA communication system has been standardized by the Telecommunications Industry Association (TIA) for use in North America and has adapted spread spectrum communication technology. The mobile station used in this system is described in the TIA/EIA Interim Standard 'Mobile Station-Base station Compatibility Standard For Dual-Mode Wide Band Spread Spectrum Cellular System' (Interim Standard IS-95 Section 6.2.2.1).

In accordance with this standard, each mobile station is provided with a rake receiver, having at least one searcher for independent pilot channel acquisition and at least three fingers for data acquisition. The searcher searches for a pilot channel transmitted by a base station sending a pseudorandom number (PN) binary code reference sequence with no modulation of information bits thereon. Reception of the pilot channel makes it possible for each mobile station to synchronize with any other channel and to select the paths/delays for which the energy of a received signal on the traffic channel is greatest. Based on the pilot channel received by the searcher, each finger receives a useful multipath component of a received signal at a different timing. A receiver of this type is described by Wang et al. in a paper titled 'Portable Telephone for CDMA Cellular System', Oki Technical Review, 150 Vol. 60 (August 1994).

In the CDMA communication system, for example, a conventional mobile station pursuant to the Interim Standard IS-95 includes generally one searcher and three fingers. The number of searchers and the number of fingers is fixed in conventional CDMA systems and does not change in response to transmission characteristics.

However, in the field of mobile radio communications employing a CDMA communication system, the transmission characteristics existing between the base stations and the mobile stations change continuously because, in general, the location of each mobile station relative to a base station changes. Thus, the strength of the signal received by a mobile station may be reduced and therefore searchers in excess of the predetermined number are required if all pilot channels of neighboring base stations are to be searched quickly.

As one solution to this problem, mobile stations have been provided with one or more additional searchers. However, this is inefficient because the additional searchers make it necessary to increase the size of the receiver, add components which are used during only a portion of the time the receiver is in operation, and increase the power consumed by the receiver.

SUMMARY OF THE INVENTION

Therefore, it is an object of the present invention to provide a radio communication apparatus including a rake receiver which adaptively assigns a searcher operation and a finger operation in response to the characteristics of the transmission path existing at a given time between the base and mobile stations.

To accomplish these objectives, a radio communication apparatus is provided which comprises:

at least one combination searcher/finger unit operable to perform (1) a searcher operation for detecting signals on the reception paths and (2) estimating the strength of each of the signals, and a finger operation for outputting a demodulated symbol in response to a command signal. The radio communication apparatus is further provided with an assignment unit for generating the command signal to assign either the searcher operation or the finger operation of a combination searcher/finger unit based on at least one of the following conditions:

(1) the number of useful information containing reception paths which can be demodulated; or (2) the number of neighboring base stations; or (3) the total signal strength of the useful reception paths; or (4) the reception error rate of the combined signal; or (5) the reception modes having an initial synchronizing mode for synchronizing with one of the base stations, a call waiting-mode for waiting for a call from the synchronized base station and a communication mode for communicating to the synchronized base station.

BRIEF DESCRIPTION OF THE DRAWINGS

These and other objects and features of the present invention will become more apparent from consideration of the following detailed description taken in conjunction with the accompanying drawings in which.

DESCRIPTION OF THE PREFERRED EMBODIMENTS

A. First embodiment of the invention

Figure 1:
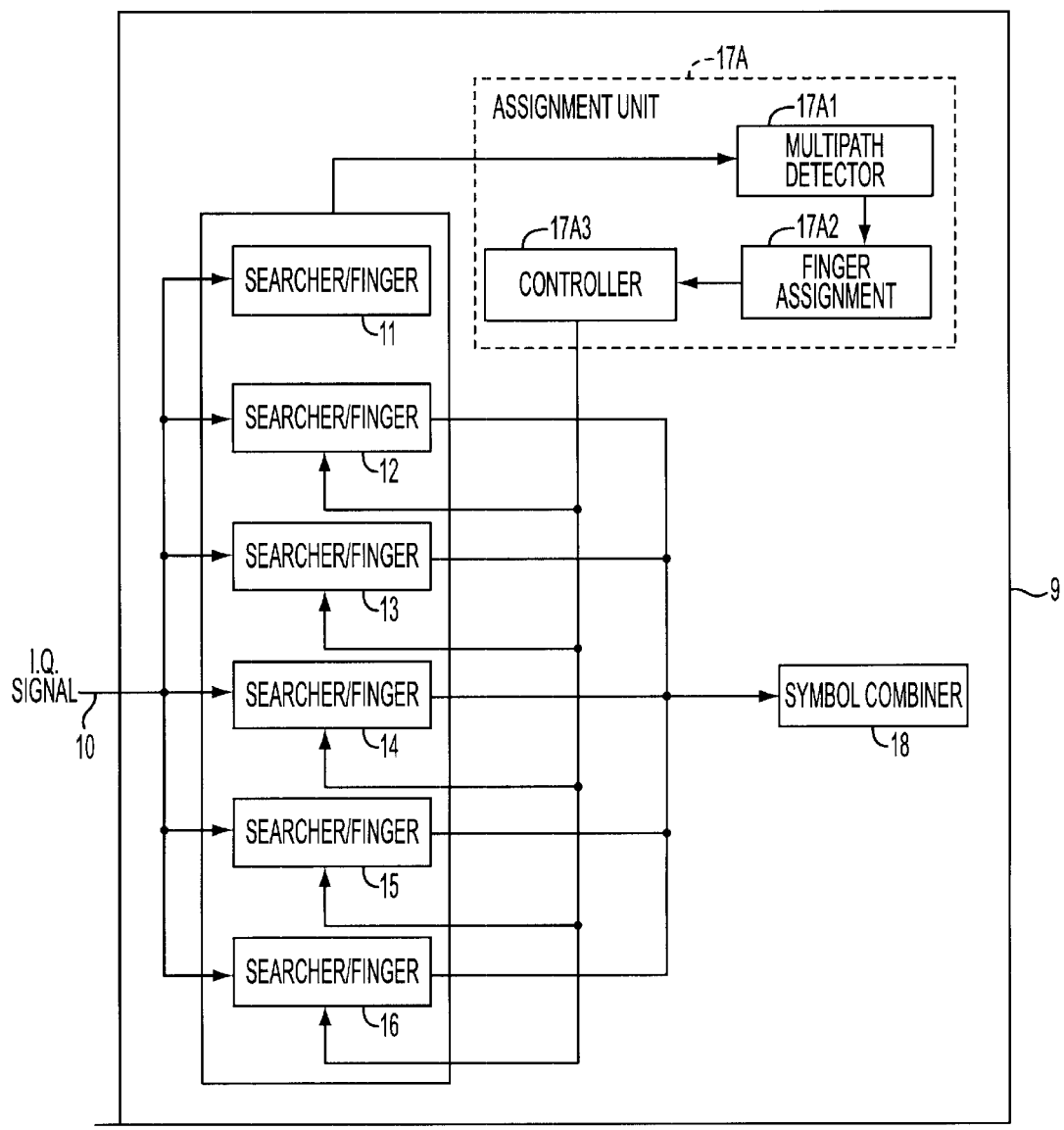
FIG. 1 is a block diagram showing the construction of a rake receiver according to a first embodiment of the invention.

FIG. 1 shows a rake receiver 9 of a CDMA communication system in accordance with a first embodiment of the invention. According to the first embodiment, an analog radio signal is received by the rake receiver 9 via an antenna, filtered, mixed to lower frequencies, automatic gain controlled, I and Q demodulated ( i.e., the combined received signal is separated into in-phase (I) and quadrature-phase (Q) components) and converted from an analog to a digital signal by conventional circuits (not shown) before being input to an input terminal 10. Thus, in FIG. 1, I and Q digital signals are input to the rake receiver 9 via the input terminal 10.

The rake receiver includes combination searcher/finger units 11–16, an assignment unit 17A, a multipath detector 17A1, finger assignment unit 17A2, a controller 17A3, and a symbol combiner 18. Each of the combination searcher/finger units 11–16 has both a searcher function and a finger function. However, one of the searcher/finger units (e.g. the searcher/finger unit 11) has only a searcher function because at least one searcher must function at all times to perform the searcher function based on the CDMA communication system regulations as set forth in the Interim Standard IS-95.

In general, when the combination searcher/finger units 11–16 function in the searcher mode, they are capable of detecting and synchronizing the strongest pilot channel among a plurality of pilot channels being transmitted from several base stations. The combination searcher/finger units 11–16 also estimate the energy of the signal (reference sequence) on each pilot channel. The estimated energy is input to the multipath detector 17A1 of the assignment unit 17A to select the timing offset for each searcher/finger unit 11–16 that functions in a finger mode to demodulate the I and Q signals.

Figure 2:
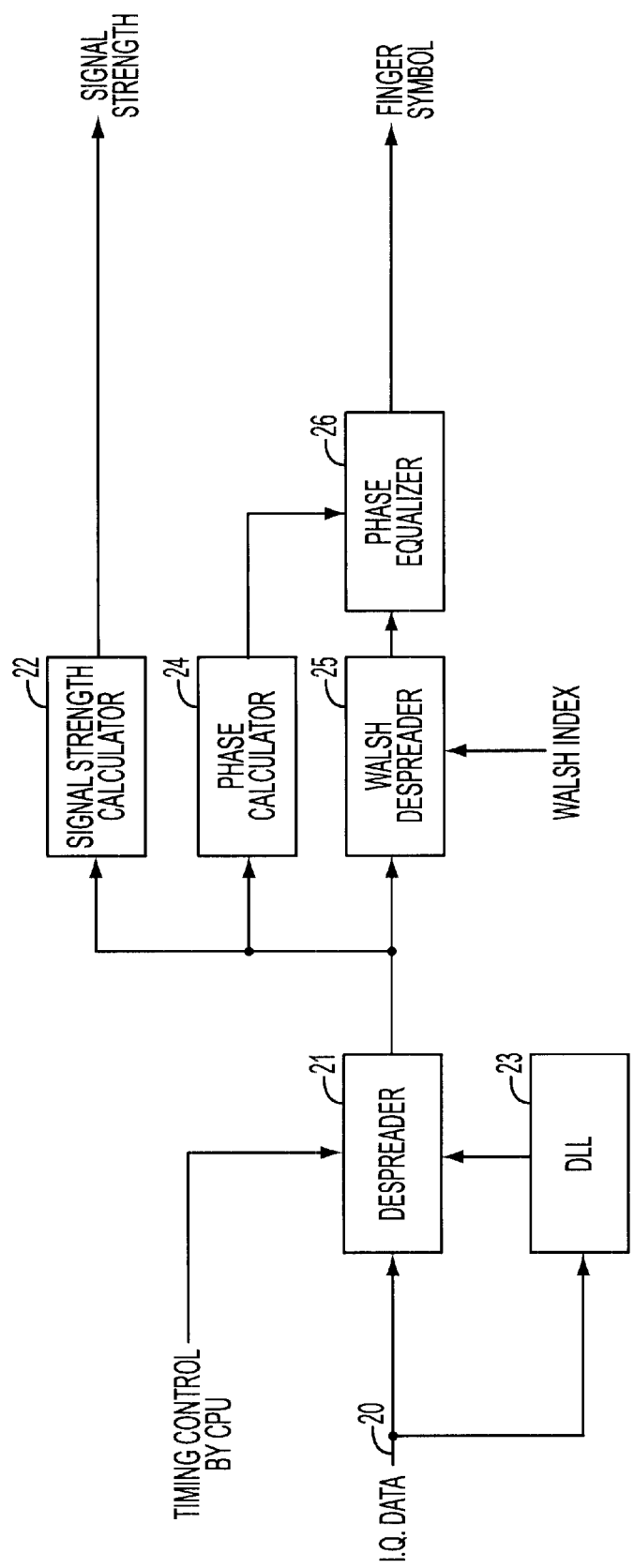
FIG. 2 is a block diagram showing the construction of a combination searcher/finger unit according to the first embodiment of the invention.

FIG. 2 shows one of the identical combination searcher/finger units 11–16. Each of these units can function in a searcher mode (when operating in a searcher mode, it is often referred to hereinafter as 'the searcher'), and can function in a finger mode (when operating in a finger mode it is often referred to hereinafter as 'the finger'). In FIG. 2, each of the combination searcher/finger units 11–16 has an input terminal 20, a despreader 21, a signal strength calculator 22, a delay lock loop (DLL) 23, a phase calculator 24, a Walsh-despreader 25 and a phase equalizer 26. When a searcher/finger unit 11–16 functions in the searcher mode, the despreader 21 despreads the I and Q signals at the timing offset indicated by the multipath detector 17A1 and then outputs the despread signal to the signal strength calculator 22. The signal strength calculator 22 measures the signal strength of the I and Q signals by calculating a correlation between the I and Q signals and the despread signals. The delay lock loop (DLL) 23, phase calculator 24, Walsh-despreader 25 and phase equalizer 26 do not function in the searcher mode.

When each of the searcher/finger units 11–16 functions in the finger mode, the despreader 21 despreads the I and Q signals at the same timing offset as in the searcher mode and outputs a despread signal to the phase calculator 24 and the Walsh despreader 25. Simultaneously, the DLL 23 calculates the signal strengths of the I and Q signals within plus or minus ½ PN chips of the timing offset and adjusts the timing despreading of the I and Q signals by the despreader 21 so that the signal strength of the despread signal is a maximum.

The phase calculator 24 estimates the phase error of the despread signal by calculating and compensating for the phase error which occurs during transmission between the base and mobile stations. The Walsh despreader 25 further despreads the despread signal with a Walsh code indicated by the base station and outputs a symbol to the phase equalizer 26. The phase equalizer 26 adjusts the phase of the symbol by using the calculated result of the phase calculator 24 and outputs it as a finger symbol, i.e., the signal output by each finger. Thus, the despreader 21, DLL 23, phase calculator 24, Walsh despreader 25 and phase equalizer 26 function in the finger mode.

Referring to the assignment unit 17A shown in FIG. 1, which includes the multipath detector 17A1, finger assignment unit 17A2 and controller 17A3. The multipath detector 17A1 analyzes each of the signal strengths of the finger symbols output from the finger to determine whether or not each finger symbol is a useful reception path for demodulation, the finger assignment unit 17A2 assigns the useful reception paths determined by the multipath detector 17A1 to the searcher/finger units 11–16 respectively and outputs a command signal to the controller 17A3, and the controller 17A3 operates the searcher/finger units 11–16 to select either a searcher mode or a finger mode in accordance with the command signal.

For example, The command signal may be composed of a 5 bits stream corresponding to the five searcher/finger units 12–16 used to select the searcher mode or the finger mode. With this command signal configuration, one of the searcher/finger units 11–16 (e.g. the searcher/finger unit 11) performs the searcher mode at all times regardless of the number of useful reception paths. The first bit of the command signal corresponds to the searcher/finger unit 12, and when the first bit is '1' the searcher/finger unit 12 performs the finger mode operation. A second bit of the command signal corresponds to the searcher/finger unit 13, and when the second bit is '1' the searcher/finger unit 13 performs the finger mode operation. Similarly, third, fourth and fifth bits correspond to the searcher/finger units 14, 15 and 16 respectively. When these bits are '1' the searcher/finger units 14, 15 and 16 perform the finger mode operation. In contrast, when the bits corresponding to each of the searcher/finger units 12–16 are '0', these units perform the searcher mode operation.

The symbol combiner 18 combines finger symbols output by the searcher/finger units 12–16 that function in the finger mode. This output is a weighted sum of the energy received along different transmission paths from a base station to the receiver and is called a maximum-ratio combine. The symbol combiner 18 is capable of adjusting the combined timing of the combination between and among the symbols since the finger symbols are not synchronized to each other.

Figure 3:
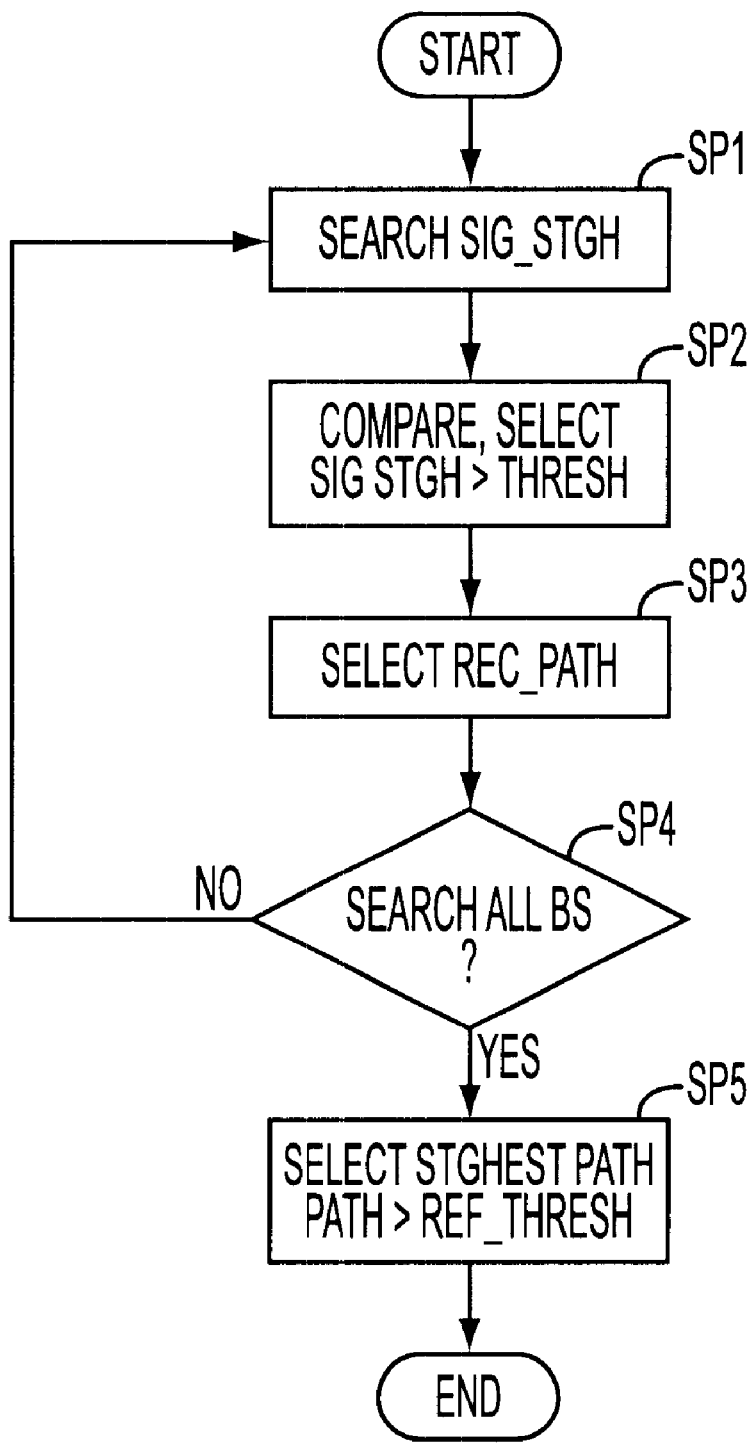
FIG. 3 is a flow chart showing the operation of a multipath detector according to the first embodiment of the invention.
Figure 4:
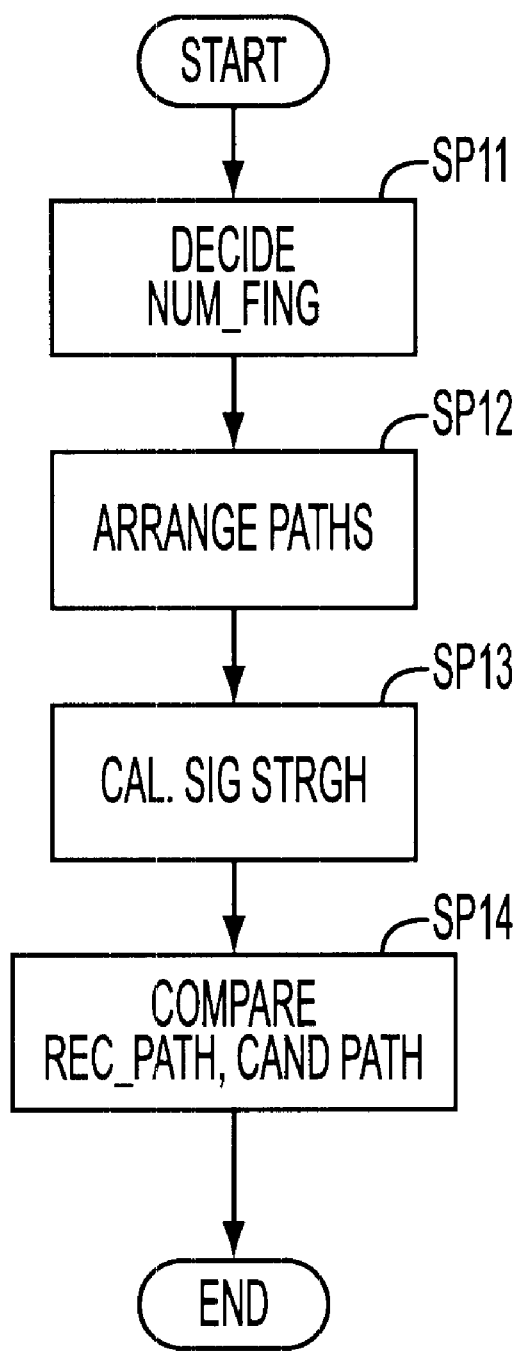
FIG. 4 is a flow chart showing the assignment operation of fingers according to the first embodiment of the invention.

Referring now to the operations of the multipath detector 17A1 and finger assignment unit 17A2 with reference to FIGS. 3 and 4, FIG. 3 is a flow chart showing the operation of the multipath detector 17A1 and FIG. 4 is a flow chart showing the operation of finger assignment unit 17A2.

The multipath detector 17A1 analyzes the signal strength of each of the I and Q signals at several different timing intervals detected by the searcher in order to select the useful multipaths of the I and Q signals, i.e., that is, those signal having an amplitude higher than a threshold value and can be demodulated. Thus, at least searcher/finger unit 11 searches the pilot channels of all base stations and acquires the timing offset of the useful multipath component of each pilot channel. If two or more searcher/finger units are performing the searcher mode operation as searchers, the pilot channel acquisition operation may be respectively performed by all of these searcher/finger units at the same time.

Referring to FIG. 3, the multipath detector 17A1 sets up the demodulating timing and search window (time interval and scope) based on the timing offset acquiring the pilot channel for a multipath search. Also the multipath detector 17A1 directs the searcher to calculate the multipath signal strengths (SIG. STGH) of the I and Q signals at different timing intervals within the search window (Step SP 1). Based on the calculated result of the multipath signal strength, useful reception paths providing signal strengths which are larger than the threshold value (THRESH) in dB (e.g. Ec/Io=−14 dB, where Ec/Io is the ratio in (dB) between the pilot energy accumulated over one PN chip period (Ec) to the total power spectral density in the received bandwidth (Io)), and which result in received signals that can be demodulated are selected and other paths (that is, useless reception paths in which the received signals can not be demodulated and have much noise) are removed (Step SP 2). Then, the multipath detector 17A1 selects up to five better reception paths corresponding to the maximum number of searcher/finger units (Step SP 3), and performs Steps SP1–SP3 for other reception paths transmitted from all of the neighboring base stations (BS) (Step SP 4). That is, Steps SP1–SP3 are repeatedly performed until all of the reception paths which can be demodulated are detected.

After calculating all of the multipath signal strengths of the reception paths, the multipath detector 17A1 selects a best reception path having the maximum multipath signal strength among the selected reception paths. Also, the multipath detector 17A1 compares the best reception path with the other selected reception paths to select final candidate paths. Thus, if the signal strength of a reception path is within −3 dB of one of the best reception s paths, its reception path can be selected as the final candidate path for demodulation and the other reception paths are removed (Step SP 5).

In this case, the mobile station selects the final candidate paths based on the signal strength. However, when the receiver is communicating with more than one base station during the soft handoff process, it may be better to combine the best reception paths of several base stations and demodulate them rather than to select reception paths from the same base station (cell diversity). Therefore it may be possible to select the best reception paths from several base stations and to weigh these selections to obtain a final candidate path.

Next, in FIG. 4, the finger assignment unit 17A2 compares the number of final candidate paths selected by the operation of Step SP5 with the maximum number of searcher/finger units that function in the finger mode. The finger assignment unit 17A2 also selects the lowest number of the number of final candidate paths and the maximum number of searcher/finger units as the number [NUM FING] which determines how many fingers are to be assigned to the acquisition of data(Step SP 11). The number of fingers used to acquire data [NUM FING] should not be changed frequently. Accordingly, this operation is performed about every 200 ms, the finger assignment unit 17A2 changing the number of fingers assigned based on the average of the data received during this period to obtain appropriate channel characteristics between the base station and mobile station.

As mentioned above, after deciding the number of the finger, the finger assignment unit 17A2 arranges the final candidate paths for the fingers according to its signal strength (Step SP 12). The finger assignment unit 17A2 receives a demodulated signal of the current reception path assigned to each finger and calculates its signal strength (Step SP 13). The finger assignment unit 17A2 compares one of the current reception paths in step SP13 with one of the final candidate paths. If the current reception path is the same as one of the final candidate paths, the corresponding finger keeps demodulating its current reception path and deletes the final candidate path from its list. If not the same, the corresponding finger changes and demodulates its current reception path to one of the final candidate paths.

In addition, the finger assignment unit 17A2 output the command signal, which operates to select the searcher mode or the finger mode, to the combination searcher/finger units 11–16 via the controller 17A3.

According to the first embodiment of the invention, when there are many useful reception paths, the rake receiver can always combine them with a maximum number of fingers. On the other hand, when there are only few useful reception paths (that is, the number of useful reception paths is less than the maximum number of fingers), the fingers corresponding to the number of useful reception paths function in the finger mode. The other searcher/finger units function in the searcher mode for searching and acquiring other useful reception paths.

B. Second embodiment of the invention

Figure 5:
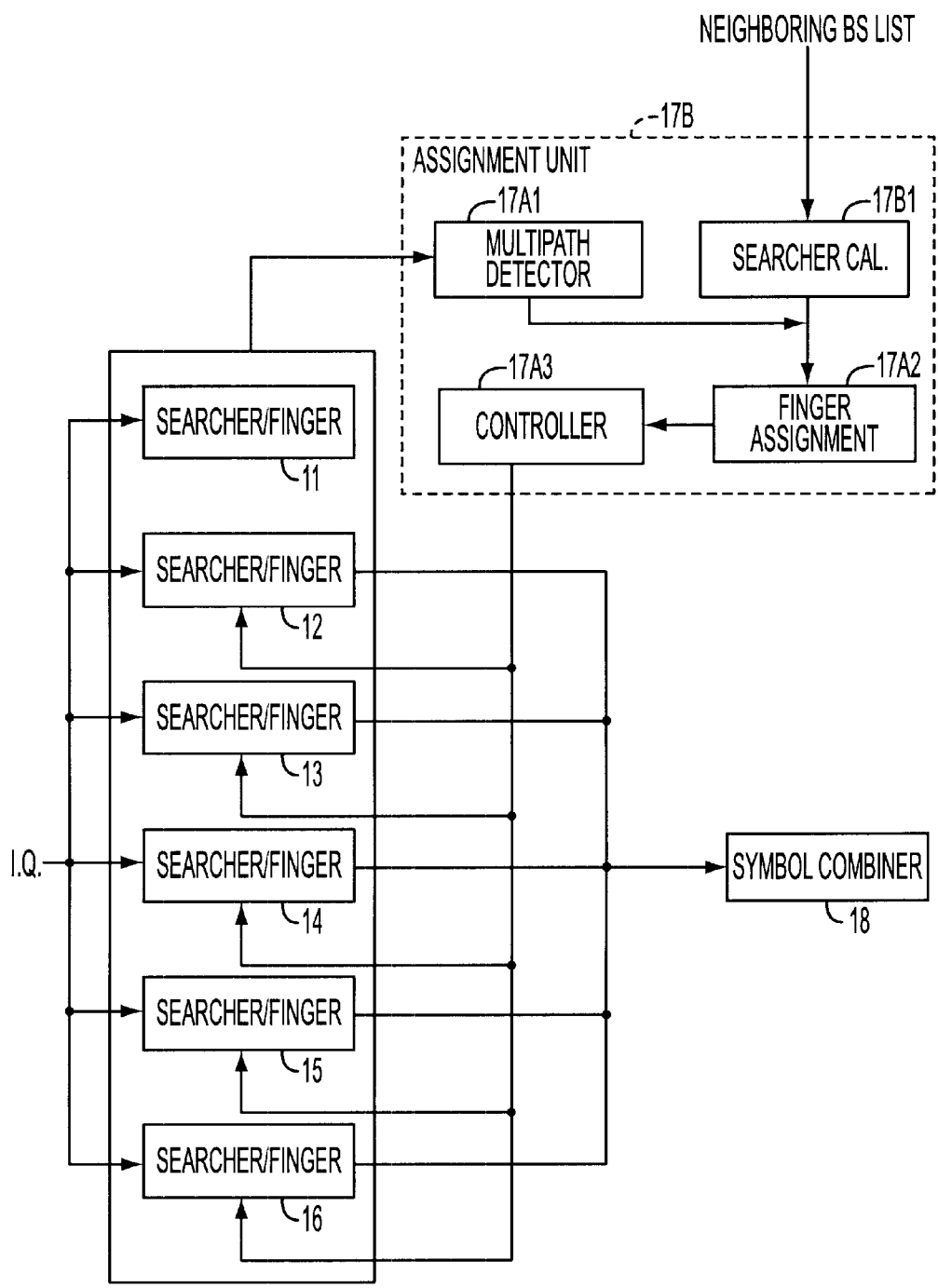
FIG. 5 is a block diagram showing the construction of a rake receiver according to a second embodiment of the invention.

FIG. 5 shows a rake receiver of a CDNA communication system in accordance with a second embodiment of the invention. According to the second embodiment, the rake receiver includes combination searcher/finger units 11–16, assignment unit 17B and symbol combiner 18. The assignment unit 17B has a multipath detector 17A1, searcher calculator 17B1, finger assignment unit 17A2 and controller 17A3.

The multipath detector 17A1 analyzes the signal strengths of the finger symbols output by the searcher/finger units 11–16.

The searcher calculator 17B1 determines the number of searcher/finger units 11–16 that function in the searcher mode (often referred to as 'the searcher') and the number of units 11–16 that function in the finger mode (often referred to as 'the finger') based on a neighboring base station list transmitted by neighboring base stations. In operation, the searcher calculator 17B1 increases the number of searchers when there are many neighboring base stations and decreases the number of searchers when there are only few neighboring base stations. Since the searcher operation increases in proportion to the number of neighboring base stations, this operation shortens the time required to complete a search. The searcher calculator 17B1 has two threshold values, threshold value 1 being less than threshold value 2, which enable it to gradually control the number of searchers by comparing the two threshold values with the number of neighboring base stations, the number of neighboring base stations being classified into three levels.

The finger assignment unit 17A2 assigns the useful reception paths determined by the multipath detector 17A1 as described in the first embodiment. However, in the second embodiment, the finger assignment unit 17A2 prioritizes the number of searcher calculated by the searcher calculator 17B1 in response to the number of neighboring base stations rather than the number of useful reception paths detected by the multipath detector 17A1. The controller 17A3 operates the combination searcher/finger units 11–16 to select either a searcher mode or a finger mode in accordance with the command signal output by the finger assignment unit 17A2.

Figure 6:
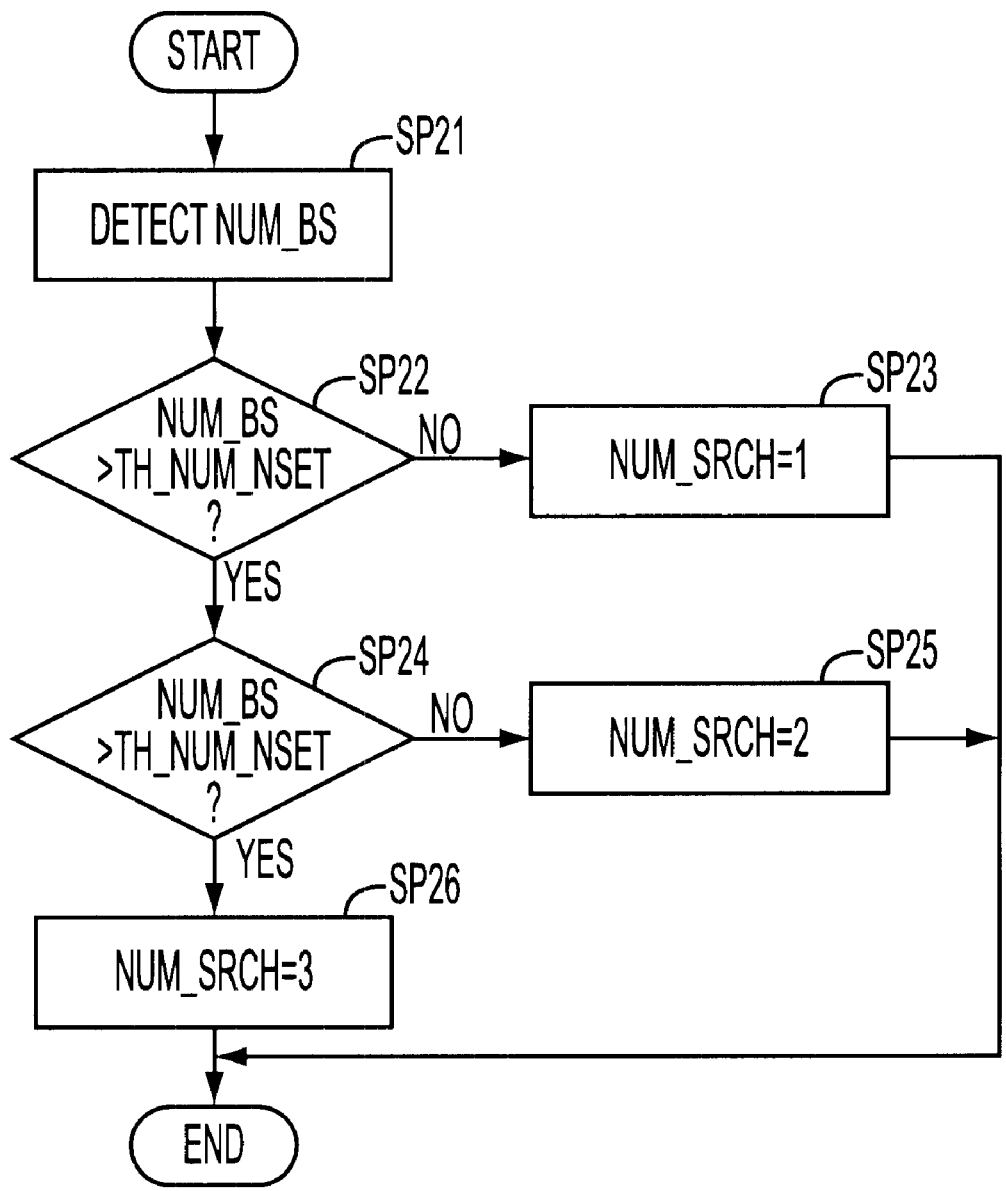
FIG. 6 is a flow chart showing the operation of a searcher calculator according to the second embodiment of the invention.
Figure 7:
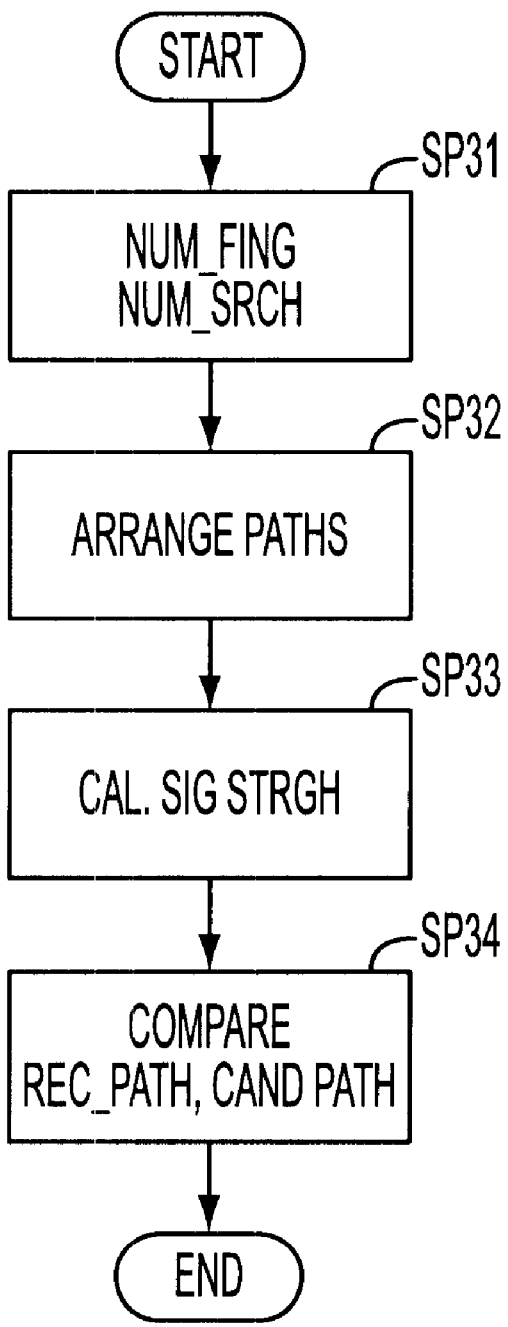
FIG. 7 is a flow chart showing the operation by which fingers are assigned according to the second embodiment of the invention.

The operation of the searcher calculator 17B1 and the finger assignment unit 17A2 is explained hereinafter with reference to FIGS. 6 and 7. FIG. 6 is a flow chart showing the operation of the searcher calculator 17B1 and FIG. 4 is a flow chart showing the operation of finger assignment unit 17A2.

The searcher calculator 17B1 calculates the number of neighboring base stations (NUM-BS) based on the neighboring base station list transmitted from the base stations (Step SP 21). The searcher calculator 17B1 then compares the number of neighboring base stations with a threshold value of 1 (TH_NUM_NSET), e.g. 7, (Step SP 22). If the number of neighboring base stations does not exceed the threshold value 1, the searcher calculator 17B1 determines the number of searchers (NUM_SRCH) as '1' (Step SP23) .If the number of neighboring base stations exceeds the threshold value 1, the searcher calculator 17B1 compares the number of neighboring base stations with the threshold value 2 (TH_NUM_NSET2), e.g. 14, (Step SP 24). If the number of neighboring base stations does not exceed the threshold value 2, the searcher calculator 17B1 determines the number of searchers (NUM_SRCH) as '2' (Step SP 25). If the number of neighboring base station exceeds the threshold value 2, the searcher calculator 17B1 determines the number of searchers (NUM_SRCH) as '3' (Step SP 26). Thus, based on the described operation, the searcher calculator 17B1 determines the number of searcher in the range 1 to 3.

Next, the finger assignment unit 17A2 subtracts the number searchers determined by the described operation (NUM_SRCH) from the maximum number (NUM FING) of combination searcher/finger units that function in the finger mode (Step SP 31). The finger assignment unit 17A2 arranges the candidate paths detected by the multipath detector 17A1 for the fingers according to its signal strength (Step SP 32). The finger assignment unit 17A2 receives a demodulated signal on the reception path assigned to each finger and calculates its signal strength (Step SP 33). The finger assignment unit 17A2 compares the current reception paths received at Step SP33 with the candidate paths. If a current reception path is the same as one of the candidate paths, the corresponding finger continues to demodulate its current reception path and deletes the candidate path from its list. If the current reception path is not the same, the corresponding finger changes its current reception path to one of the candidate paths (Step SP 34). In addition, the finger assignment unit 17A2 output the command signal, which operates to select the searcher mode or the finger mode, for the combination searcher/finger units 11–16 via the controller 17A3.

According to the second embodiment, the mobile station is able to increase or decrease the number of searcher in accordance with the number of neighboring base stations. Accordingly, the time required for a mobile station to search a large number of pilot channels is reduced and useful reception paths from the neighboring base stations are established.

C. Third embodiment of the invention

Figure 8:
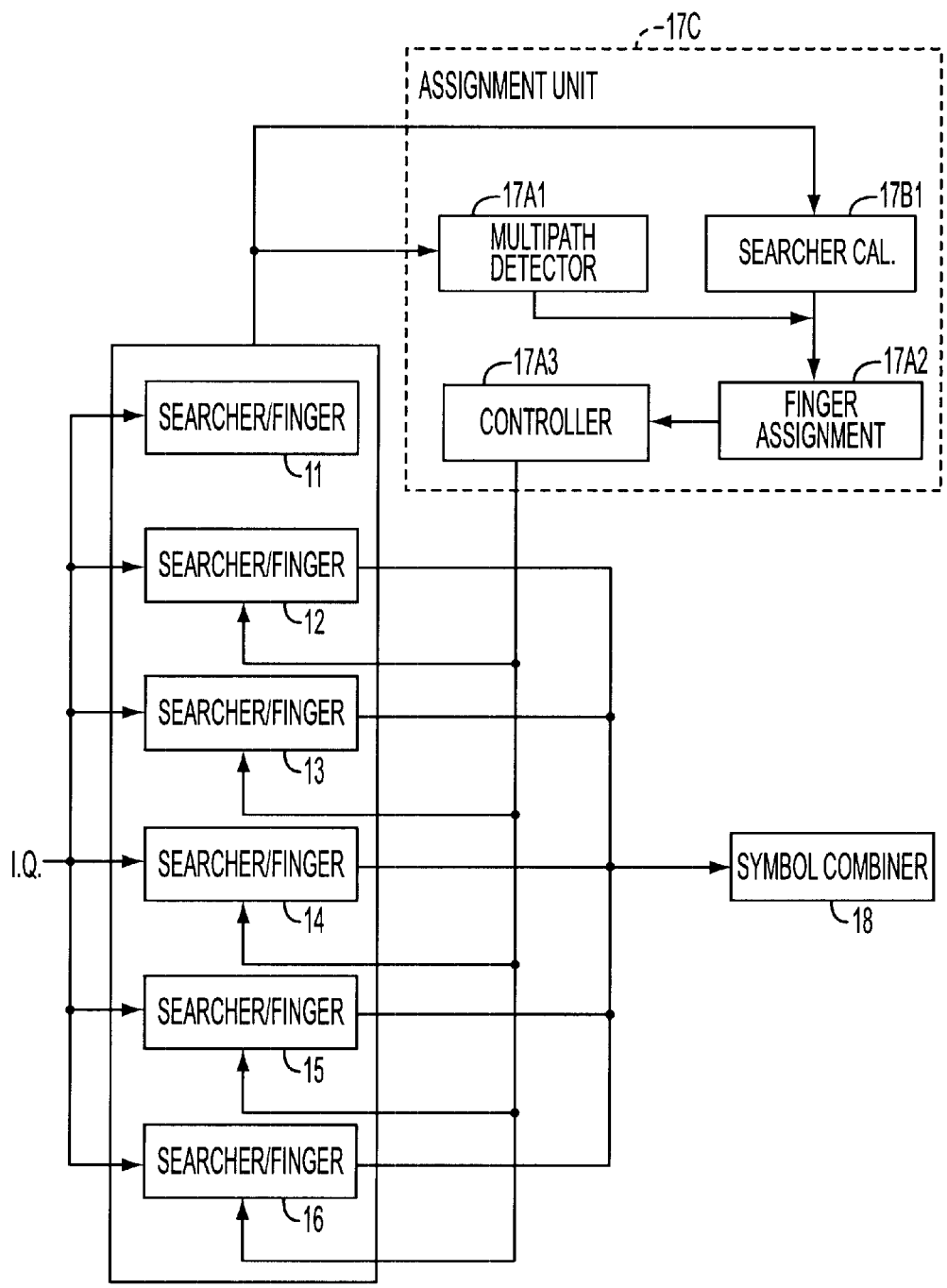
FIG. 8 is a block diagram showing the construction of a rake receiver according to the third embodiment of the invention.

FIG. 8 shows a rake receiver of a CDMA communication system in accordance with a third embodiment of the invention. According to the third embodiment, the rake receiver includes combination searcher/finger units 11–16, assignment unit 17c and symbol combiner 18. The assignment unit 17c includes a multipath detector 17A1, searcher calculator 17B1, finger assignment unit 17A2 and controller 17A3.

The multipath detector 17A1 analyzes the signal strength of each of the finger symbols output from the searcher/finger units 11–16.

The searcher calculator 17B1 determines the number of searcher/finger units 11–16 that function in the searcher mode based on the total reception signal strength of all of the reception paths. That is, since it is necessary to search the useful reception paths having enough signal strength to maintain good communication quality, the searcher calculator 17B1 increases the number of searchers when the signal strength is decreasing and decreases the number of searchers when the signal strength increases. The searcher calculator 17B1 has two threshold values (threshold value 1 which is greater than threshold value 2) to gradually control the number of searchers by comparing the two threshold values with the total reception signal strength, the total reception signal strength being classified into three levels.

Figure 9:
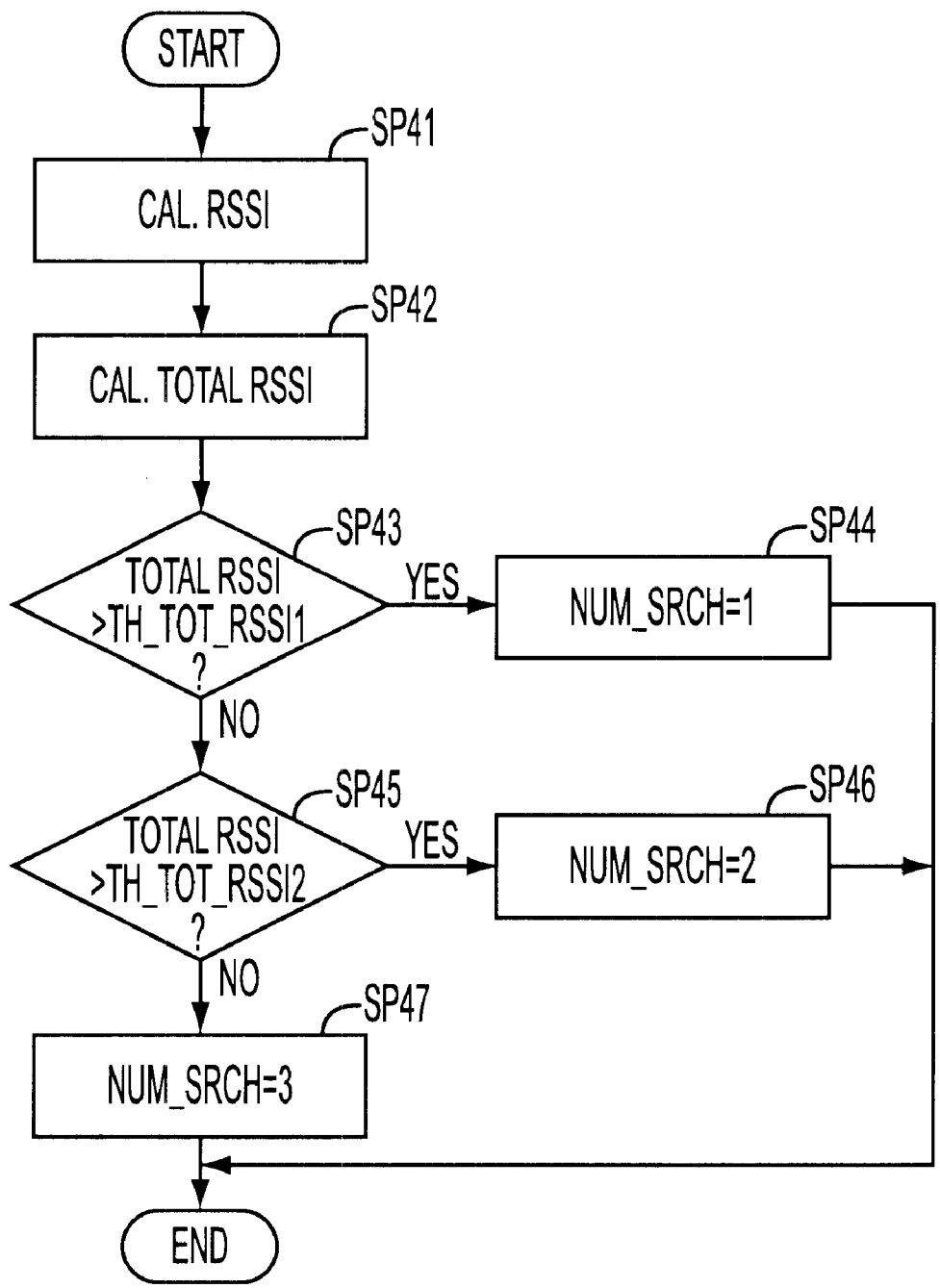
FIG. 9 is a flow chart showing the operation of a searcher calculator according to the third embodiment of the invention.

The operation of the searcher calculator 17B1 will now be described with reference to the flow chart of FIG. 9.

The reception signal strength (RSSI) from each of the combination searcher/finger units 11–16 that function as a finger (Step SP 41)is input to the searcher calculator 17B1. The searcher calculator 17B1 then calculates the total reception signal strength (TOT_RSSI) by adding the reception signal strengths (RSSI) from each of the fingers (Step SP 42).

The searcher calculator 17B1 compares the total signal strength (TOT_RSSI) with the threshold value 1 (e.g. Ec/Io=−10 dB) which is larger than the threshold value 2 (Step SP 43). If the total reception signal strength (TOT_RSSI) exceeds the threshold value 1, the searcher calculator 17B1 determines the number of searchers (NUM_SRCH) as '1' (Step SP 44). If the total reception signal strength (TOT_RSSI) does not exceed the threshold value 1, the searcher calculator 17B1 compares the total reception signal strength (TOT_RSSI) with the threshold value 2 (e.g. Ec/Io=−14 dB)), (Step SP 45). If the total reception signal strength (TOT_RSSI) exceeds the threshold value 2, the searcher calculator 17B1 determines the number of searchers (NUM_SRCH) as '2' (Step SP 46). If the total reception signal strength does not exceed the threshold value 2, the searcher calculator 17B1 determines the number of searchers (NUM_SRCH) as '3' (Step SP 47).

Based on this operation, the searcher calculator 17B1 determines the number of searcher to be in the range 1 to 3. The number of searcher is input to the finger assignment unit 17A2. Next, the finger assignment unit 17A2 subtracts the number of searcher determined by the above operation (SRCH NUM) from the maximum number (NUM FING) of the fingers. The finger assignment unit 17A2 arranges the candidate paths detected by the multipath detector 17A1 for the fingers according to its signal strength. The finger assignment unit 17A2 receives a demodulated signal from the reception path assigned to each finger and calculates its signal strength.

The finger assignment unit 17A2 compares the current reception paths with one of the candidate paths. If each reception path is the same as one of the candidate paths, the corresponding finger maintains demodulation of its reception path and deletes the candidate path from its list. If not the same, the corresponding finger changes the current reception path to one of the candidate paths. In addition, the finger assignment unit 17A2 outputs the command signal, which operates to select the searcher mode or the finger mode, for the combination searcher/finger units 11–16 via the controller 17A3.

According to the third embodiment, the mobile station increases or decreases the number of searchers in response to the total reception signal strength. Accordingly, the time required for a mobile station to search for a large number of pilot channels transmitted from neighboring base stations is decreased and useful reception paths are found quickly.

D. Fourth embodiment of the invention

Figure 10:
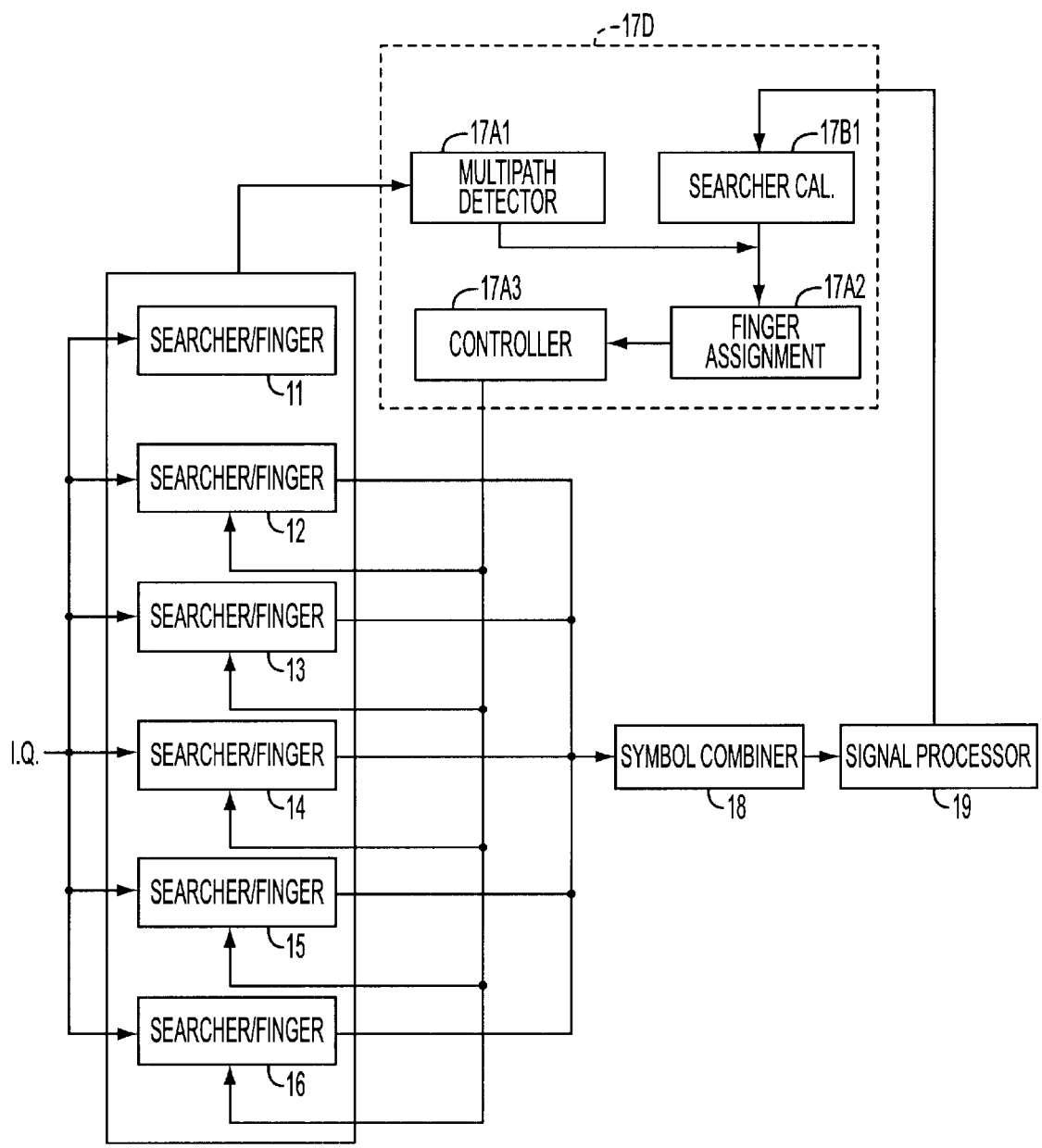
FIG. 10 is a block diagram showing the construction of a rake receiver according to the fourth embodiment of the invention.

FIG. 10 shows a rake receiver of a CDMA communication system in accordance with a third embodiment of the invention. According to the third embodiment, the rake receiver includes combination searcher/finger units 11–16, assignment unit 17D, symbol combiner 18 and signal processor 19. The assignment unit 17D has a multipath detector 17A1, searcher calculator 17B1, finger assignment unit 17A2 and controller 17A3.

The signal processor 19 calculates the reception frame error rates of the combined signal output from the symbol combiner 18 based on an error control system, such as a cyclic redundancy check, and inputs the error rates to the searcher calculator 17B1.

The multipath detector 17A1 analyzes the signal strengths of each of the finger symbols output from the combination searcher/finger units 11–16.

The searcher calculator 17B1 determines the number of searcher/finger units 11–16 that function in the searcher mode based on the reception frame error rates of the demodulated signal calculated by the signal processor 19. Thus, the searcher calculator 17B1 increases the number of searchers when the reception frame error rate increases and decreases the number of searchers when the reception frame error rate decreases.

The searcher calculator 17B1 has two threshold values (threshold value 1<threshold value 2) which permit it to gradually control the reception frame error rate by comparing the two threshold values, the reception frame error rate being classified into three levels.

Figure 11:
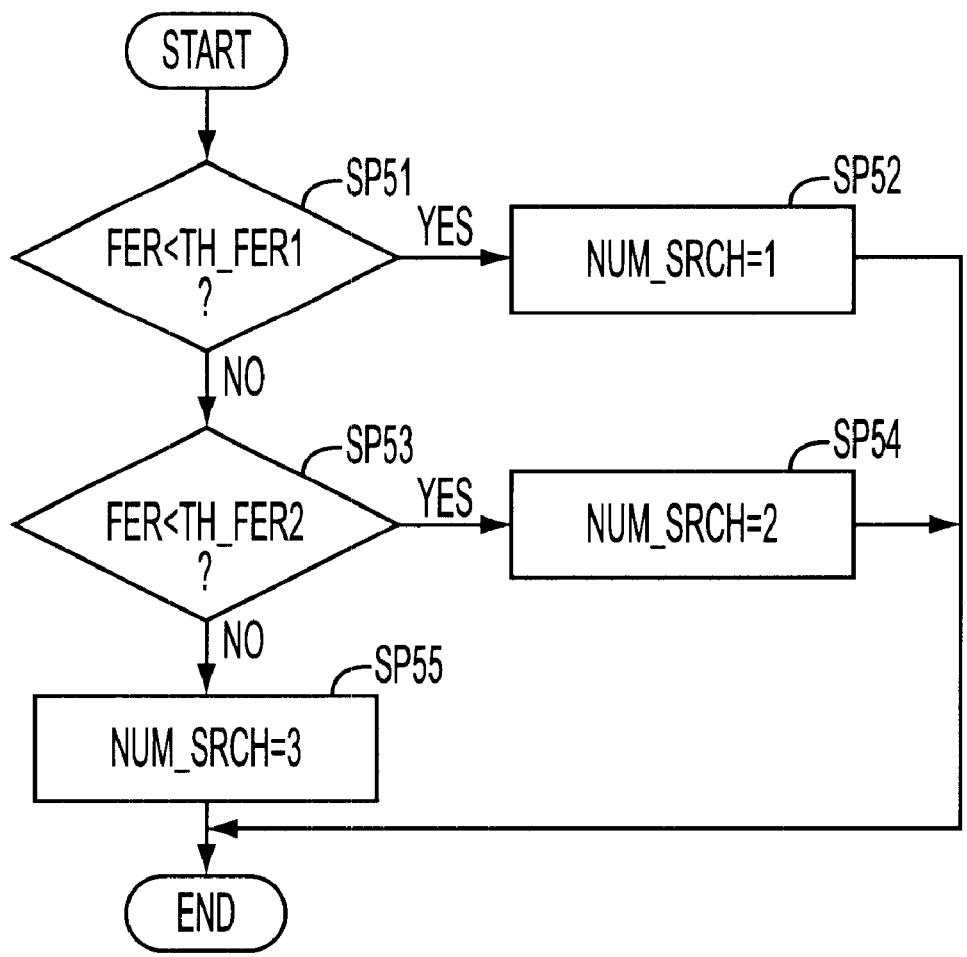
FIG. 11 is a flow chart showing the operation of a searcher calculator according to the fourth embodiment of the invention.

The operation of the searcher calculator 17B1 will now be described with reference to the flow chart of FIG. 11.

The searcher calculator 17B1 receives the reception frame error rate from the signal processor 19 and compares the reception frame error rate (FER) with the threshold value 1 (e.g. 1%) which is smaller than the threshold value 2 (Step SP 51). If the reception frame error rate (FER) does not exceed the threshold value 1, the searcher calculator 17B1 determines the number of searchers (NUM_SRCH) as '1' (Step SP 52). If the reception frame error rate (FER) exceeds the threshold value 1, the searcher calculator 17B1 compares it with the threshold value 2 (e.g. 3%) (Step SP 53). If the reception frame error rate (FER) does not exceed the threshold value 2, the searcher calculator 17B1 determines the number of searchers (NUM_SRCH) as '2' (Step SP 54). If the reception frame error rate (FER) exceed the threshold value 2, the searcher calculator 17B1 determines the number of searchers (NUM_SRCH) as '3' (Step SP 55).

Based on the above operation, the searcher calculator 17B1 determines the number of searchers in the range 1 to 3. The number of searchers is then input to the finger assignment unit 17A2.

Next, the finger assignment unit 17A2 subtracts the number of searchers determined by the above operation (SRCH NUM) from the maximum number (NUM FING) of fingers. The finger assignment unit 17A2 arranges the candidate paths detected by the multipath detector 17A1 according to their signal strength and selects the candidate paths in accordance with the number of fingers determined by the above operations (Step SP 66). The finger assignment unit 17A2 receives a demodulated signal from the current reception path assigned to each finger and calculates its signal strength.

The finger assignment unit 17A2 compares the reception paths received with one of the candidate paths. If each reception path is the same as one of the candidate paths, the corresponding finger continues to demodulate its current reception path and deletes the candidate paths from its list. If the reception path is not the same, the corresponding finger changes the current reception path to one of the candidate paths.

In addition, the finger assignment unit 17A2 outputs the command signal, which operates to select the searcher mode or the finger mode, for the combination searcher/finger units 11–16 via the controller 17A3.

According to the fourth embodiment, the mobile station increases or decreases the number of searchers in response to the reception frame error rate (FER). Accordingly, the time required for the mobile station to search a large number pilot channels transmitted from neighboring base stations is decreased and the useful reception paths are found quickly when the mobile station encounters a condition in which FER increased.

E. Fifth embodiment of the invention

Figure 12:
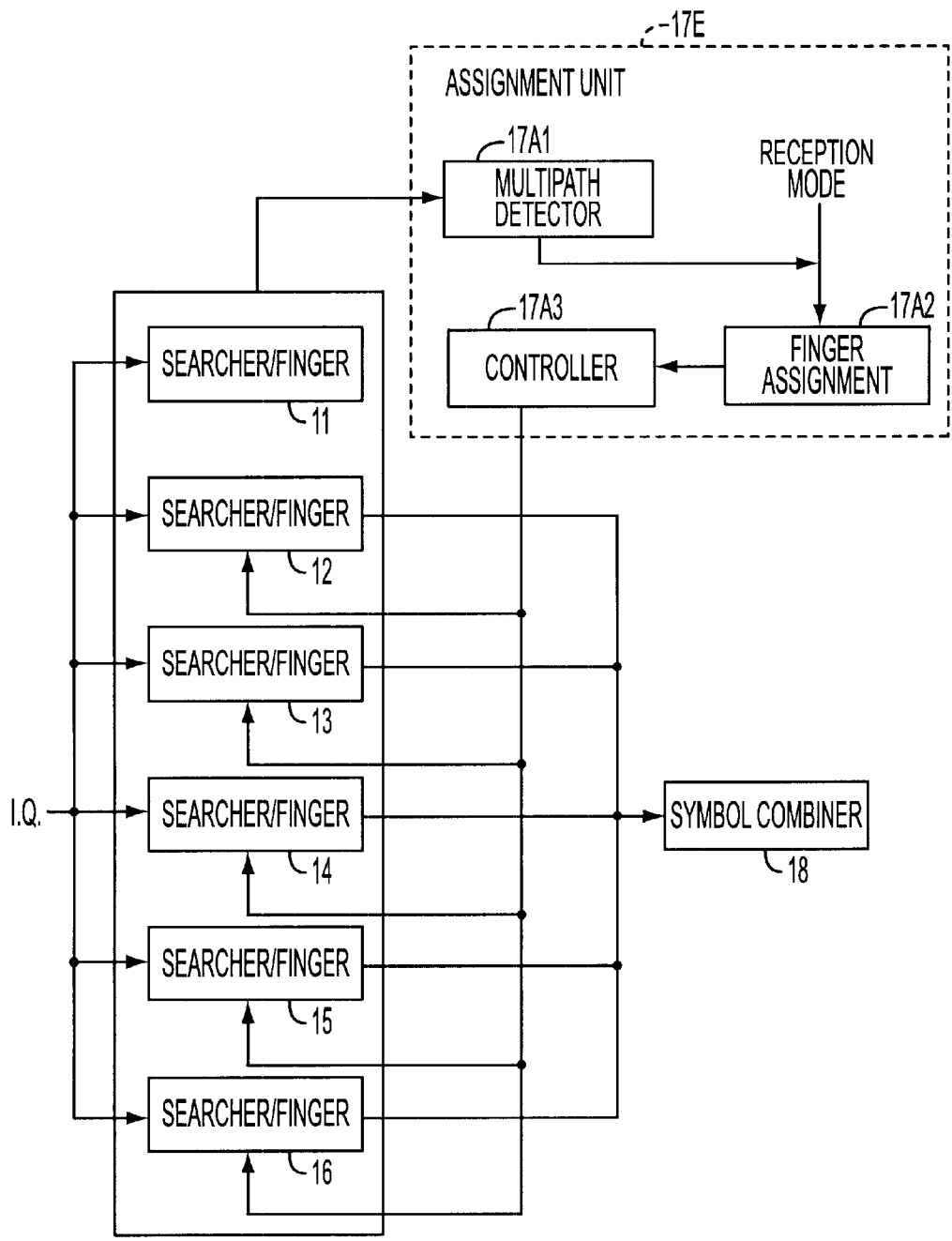
FIG. 12 is a block diagram showing the construction of a rake receiver according to the fifth embodiment of the invention.

FIG. 12 shows a rake receiver of a CODMA communication system in accordance with a fifth embodiment of the invention. According to the fifth embodiment, the rake receiver includes combination searcher/finger units 11–16, assignment unit 17E and symbol combiner 18. The assignment unit 17E has a multipath detector 17A1, finger assignment unit 17A2 and controller 17A3.

The multipath detector 17A1 analyzes the signal strength of each of the finger symbols output from the combination searcher/finger units 11–16. The finger assignment unit 17A2 determines the number of combination searcher/finger units that function as searchers based on the reception modes. For example, the finger assignment unit 17A2 distinguishes the following reception modes:

(1) an initial synchronizing mode for synchronizing with one of the base stations;

(2) a call waiting mode for waiting for a call from the synchronized base station; and (3) a communication mode for communicating to the synchronized base station.

Figure 13:
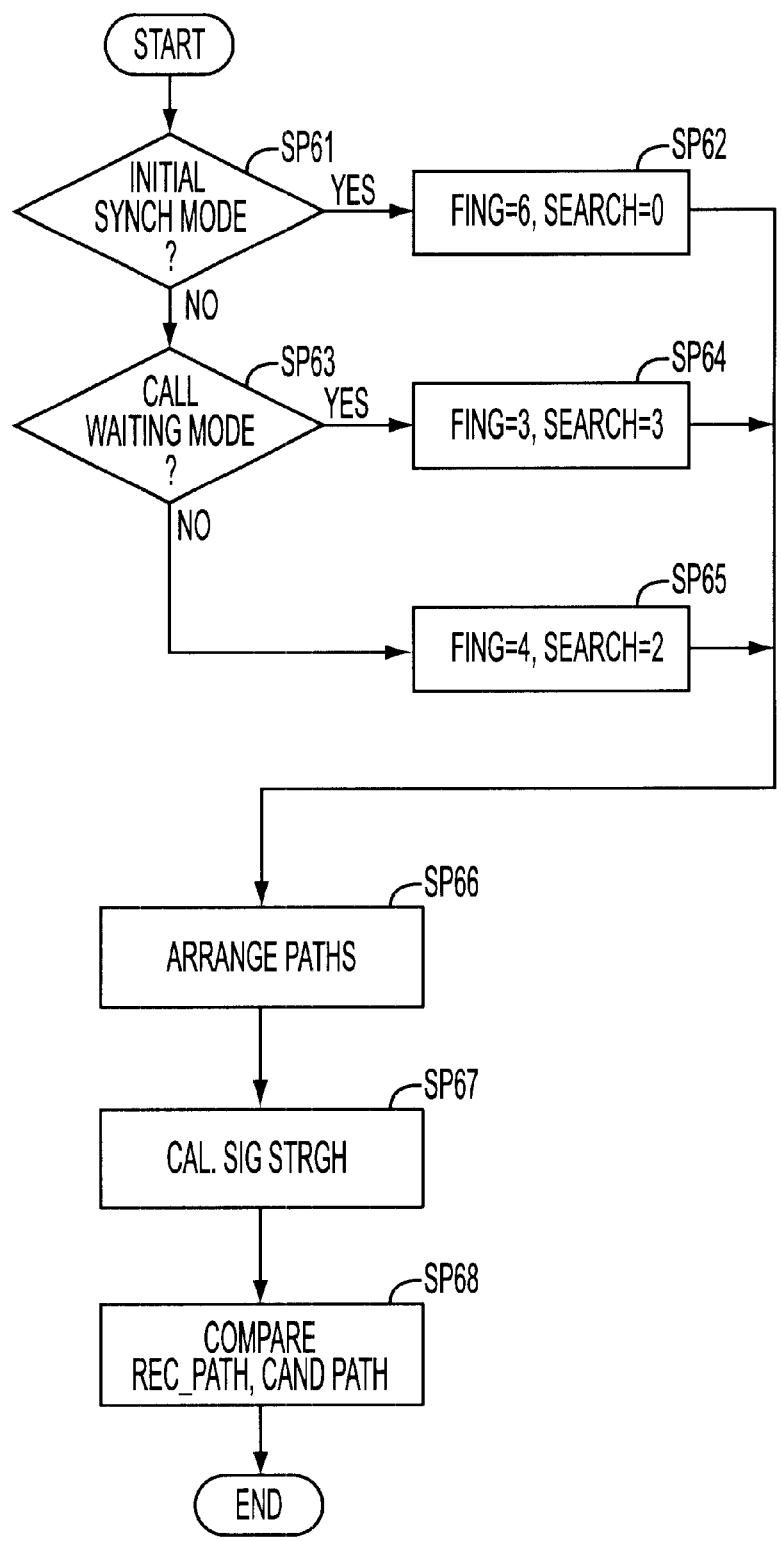
FIG. 13 is a flow chart showing the operation of a searcher calculator according to the fifth embodiment of the invention.

The operation of the finger assignment unit 17A2 will now be described with reference to the flow chart of FIG. 13.

The finger assignment unit 17A2 checks the reception modes to detect the initial synchronizing mode (Step SP 61). If the mobile station performs the initial synchronizing mode, the finger assignment unit 17A2 assigns all of the combination searcher/finger units 11–16 for operation in the searcher mode in order to synchronize with a base station as soon as possible (Step SP 62). If the mobile station does not perform the initial synchronizing mode, the finger assignment unit 17A2 checks the reception modes to detect the call waiting mode (SP 63). If the mobile station is in call waiting mode, the finger assignment unit 17A2 assigns three of the combination searcher/finger units 11–16 to operate in the searcher mode and assigns the three remaining searcher/finger units to operate in the finger mode (Step SP 64).

If the mobile station is not in the call-waiting mode, the finger assignment unit 17A2 checks the reception modes to detect the communicating mode (Step SP 63). If the mobile station communicates with the base station, the finger assignment unit 17A2 assigns two of the combination searcher/finger units 11–16 to operate in the searcher mode and assigns the remaining four searcher/finger units to operate in the finger mode in order to maintain speech quality by the use of four fingers while searching the other pilot channel for hand-off operation by using two searchers (Step SP 65).

According to the fifth embodiment, the mobile station increases or decreases the number of searcher in response to the reception mode. Accordingly, for each mobile station the operating time of each of the reception modes is shortened and ps high speech quality is maintained.

Summarizing, in the five described embodiments of the invention the assignment of searchers and fingers is based on (1) the number of useful reception paths, (2) the number of neighboring base stations, (3) the total signal strength, (4) the reception frame error rate, and (5) the reception mode respectively. However, it is possible to add further features to each embodiment so that the assignment of searchers and fingers is also based on moving speed, time, and frequency range of the communication. In addition, adaptation of the invention to CDMA communication systems has been described for each embodiment. However, it is possible to adapt the invention to other communication systems which use a rake receiver.

What is claimed is:

1. A radio communication apparatus including a rake receiver for searching and combining reception paths comprising:
    at least one combination searcher/finger unit, said at least one combination searcher/finger unit performing
        a searcher operation for detecting signals on the reception paths and estimating the signal strength of each of said signals; and
        a finger operation for outputting a demodulated symbol in response to a command signal; and
    an assignment unit for generating said command signal, said assignment unit assigning either said searcher operation or said finger operation in accordance with the number of reception paths transmitting a signal suitable for demodulation.

2. A radio communication apparatus according to claim 1 wherein a plurality of said combination searcher/finger units are provided and wherein said assignment unit comprises:
    a multipath detector, said multipath detector detecting a first reception path having the strongest signal strength and a second reception path having a signal strength which is a predetermined amount less than said strongest signal strength; and
    a finger assignment unit coupled to said multipath detector, said finger assignment unit assigning a first set of said plurality of combination searcher/finger units to provide finger operation for said reception paths up to the number of reception paths detected by said multipath detector, and for assigning a second set of said plurality of combination searcher/finger units to provide searcher operation.

3. A radio communication apparatus according to claim 2 wherein the difference between the signal strengths of said first and second reception paths is 3 dB.

4. A radio communication apparatus including a rake receiver for searching and combining reception paths from a plurality of neighboring base stations comprising:
    at least one combination searcher/finger unit, said at least one combination searcher/finger unit performing
        a searcher operation for detecting signals on the reception paths from the plurality of neighboring base stations and estimating the signal strength of each of said signals; and
        a finger operation for outputting a demodulated symbol in response to a command signal; and
    an assignment unit for generating said command signal, said assignment unit assigning either said searcher operation or said finger operation in accordance with the number of neighboring base stations.

5. A radio communication apparatus according to claim 4 wherein said assignment unit comprising;
    a multipath detector for detecting a reception path having a signal thereon of sufficient strength for demodulation thereof; and
    a finger assignment unit for assigning one of said combination searcher/finger unit to function as a searcher if the number of neighboring base stations is below a first threshold value, for assigning two of said combination searcher/finger unit to function as a searcher if the number of said neighboring base stations is between the first threshold value and a second threshold value, and for assigning three of said combination searcher/finger unit to function as a searcher if the number of neighboring base stations is above the second threshold value, where said first threshold value is less than said second threshold value.

6. A radio communication apparatus according to claim 5, wherein said first threshold value is 7 and said second threshold value is 14.

7. A radio communication apparatus according to claim 5 wherein the number of neighboring base stations is set forth in a list transmitted from base station.

8. A radio communication apparatus including a rake receiver for searching and combining a plurality of useful reception paths comprising:
    at least one combination searcher/finger unit, said at least one combination searcher/finger unit performing
        a searcher operation for detecting signals on the reception paths and estimating the signal strength of each of said signals; and
        a finger operation for outputting a demodulated symbol in response to a command signal; and
    an assignment unit for generating said command signal, said assignment unit assigning either said searcher operation or said finger operation in accordance with the total signal strength of the useful reception paths, said useful reception paths being paths transmitting signals suitable for demodulation.

9. A radio communication apparatus according to claim 8 which includes a plurality of combination searcher/finger units and wherein said assignment unit comprises;
    a multipath detector for detecting reception paths among said plurality of reception paths having a signal thereon of sufficient strength for demodulation thereof;
    a searcher calculator for calculating a total reception signal strength by adding the signal strengths of all of said plurality of reception paths; and
    a finger assignment unit for assigning three of said combination searcher/finger units to function as a searcher if said total reception signal strength is below a first threshold value, for assigning two of said combination searcher/finger units to function as searchers if the total reception signal strength is between said first threshold value and a second threshold value, and for assigning one of said combination searcher/finger units to function as a searcher if said total reception signal strength is above said second threshold value, said first threshold value being smaller than said second threshold value.

10. A radio communication apparatus according to claim 9 wherein said first threshold value is −14 dB and second threshold value is −10 dB.

11. A radio communication apparatus including a rake receiver for searching and combining reception paths comprising:

at least one combination searcher/finger unit, said at least one combination searcher/finger unit performing
    a searcher operation for detecting signals on the reception paths and estimating the signal strength of each of said signals; and
    a finger operation for outputting a demodulated combined signal in response to a command signal;
  a signal processor for calculating a reception frame error rate of said combined signal; and
  an assignment unit assigning either said searcher operation or said finger operation in accordance with said reception frame error rate.

12. A radio communication apparatus according to claim 11 which includes a plurality of combination searcher/finger units and wherein said assignment unit comprises:

a multipath detector for detecting reception paths among said plurality of reception paths having a signal thereon of sufficient strength for demodulation thereof; and
  a finger assignment unit for assigning three of said combination searcher/finger units to function as searchers if the reception frame error rate is below a first threshold value, for assigning two of said combination searcher/finger units to function as searchers if the reception frame error rate is between the first threshold value and a second threshold value, and for assigning one of said combination searcher/finger units to function as a searcher if the reception frame error rate is above the second threshold value, where said first threshold value is smaller than said second threshold value.

13. A radio communication apparatus according to claim 12, wherein, the first threshold value is 1% and the second threshold value is 3%.

14. A radio communication apparatus including a plurality of base stations and a rake receiver for searching and combining reception paths comprising:

at least one combination searcher/finger unit, said at least one combination searcher/finger unit performing
    a searcher operation for detecting signals on the reception paths and estimating the signal strength of each of said signals; and
    a finger operation for outputting a demodulated symbol in response to a command signal; and
  an assignment unit for generating said command signal, said assignment unit assigning either said searcher operation or said finger operation in accordance with a reception modes having an initial synchronizing mode for synchronizing with one of the base stations, a call waiting-mode for waiting for a call from the synchronized base station and a communication mode for communicating to the synchronized base station.

15. A radio communication apparatus according to claim 14 which includes a plurality of combination searcher/finger units and wherein said assignment unit further comprises:

a multipath detector for detecting a reception path having a sufficient signal strength for demodulation;
  a finger assignment unit for assigning all of said combination searcher/finger units to function as a searcher if the reception mode is an initial synchronizing mode, for assigning a larger number of said combination searcher/finger units that function as a searcher than said combination searcher/finger units that function as a finger if the reception mode is a call waiting mode and for assigning a smaller number of said combination searcher/finger units that function as a searcher than said combination searcher/finger units that function as a finger operation if the reception mode is a communication mode.

16. A method of assigning a searcher operation or a finger operation for a plurality of combination searcher/finger units, which comprising the steps of;

detecting signals on reception paths between a base station and a mobile station;
  estimating the signal strength of each of said signals; and
  assigning either said searcher operation or said finger operation in accordance with the number of reception paths transmitting a signal suitable for demodulation.

17. The method of claim 16, wherein the number of said reception paths suitable for demodulation is the sum of the reception path having the strongest signal strength and the other reception paths having a signal strength which is a predetermined amount less that said strongest signal strength.

* * * * *